US012196409B2

(12) United States Patent
Wu et al.

(10) Patent No.: US 12,196,409 B2
(45) Date of Patent: Jan. 14, 2025

(54) FAN LAMP

(71) Applicants: SUZHOU OPPLE LIGHTING CO., LTD., Jiangsu (CN); OPPLE LIGHTING CO., LTD., Shanghai (CN)

(72) Inventors: Wangbosheng Wu, Jiangsu (CN); Yaohai Wang, Jiangsu (CN); Dali Zhou, Jiangsu (CN); Dingde Zhou, Jiangsu (CN)

(73) Assignees: SUZHOU OPPLE LIGHTING CO., LTD., Suzhou (CN); OPPLE LIGHTING CO., LTD., Shanghai (CN)

( * ) Notice: Subject to any disclaimer, the term of this patent is extended or adjusted under 35 U.S.C. 154(b) by 0 days.

(21) Appl. No.: 18/084,297

(22) Filed: Dec. 19, 2022

(65) Prior Publication Data

US 2023/0124912 A1 Apr. 20, 2023

Related U.S. Application Data

(63) Continuation of application No. PCT/CN2021/102403, filed on Jun. 25, 2021.

(30) Foreign Application Priority Data

Jun. 30, 2020 (CN) ......................... 202010614970.6
Jun. 30, 2020 (CN) ......................... 202021250460.7

(51) Int. Cl.
*F21V 33/00* (2006.01)
*F04D 25/06* (2006.01)
(Continued)

(52) U.S. Cl.
CPC ...... *F21V 33/0096* (2013.01); *F04D 25/0613* (2013.01); *F04D 25/088* (2013.01); *F04D 29/366* (2013.01); *F21S 8/063* (2013.01)

(58) Field of Classification Search
CPC .. F21V 33/0096; F04D 25/06; F04D 25/0606; F04D 25/0613; F04D 25/08;
(Continued)

(56) References Cited

U.S. PATENT DOCUMENTS 9,506,644 B2 11/2016 Liu
9,901,039 B1 * 2/2018 Dellerson ................ A01G 9/20
(Continued)

FOREIGN PATENT DOCUMENTS

CN 204240199 U 4/2015
CN 108302056 A 7/2018
(Continued)

OTHER PUBLICATIONS

CN109114038A_MachineTranslation (Chen, Z.) 2019-01-01. [retrieved on 2023-10-11] Retrieved from: Espacenet (Year: 2019).*
(Continued)

*Primary Examiner* — Elton K Wong
(74) *Attorney, Agent, or Firm* — Arch & Lake LLP; Shen Wang; Hao Tan

(57) ABSTRACT

A fan lamp includes a ceiling assembly, a hanging rod, a blade assembly, a light source assembly and a driver. The blade assembly includes a base plate, retractable blades and a driving motor; the retractable blades are rotatably mounted on the base plate. The driving motor is connected to the base plate; one end of the hanging rod is connected to the ceiling assembly. The other end of the hanging rod is connected to a first end of the driving motor; the light source assembly is connected to a second end of the driving motor, and the light source assembly is located at the side of the blade assembly away from the ceiling assembly. The driver is mounted on the ceiling assembly, the blade assembly, or the light source
(Continued)

assembly. And the driver is configured to be electrically connected to both the driving motor and the light source assembly.

20 Claims, 10 Drawing Sheets

(51) Int. Cl.
*F04D 25/08* (2006.01)
*F04D 29/36* (2006.01)
*F21S 8/06* (2006.01)

(58) Field of Classification Search
CPC ...... F04D 25/088; F04D 29/36; F04D 29/362; F04D 29/366; F21S 8/063
See application file for complete search history.

(56) References Cited

U.S. PATENT DOCUMENTS

| | | | | |
|---|---|---|---|---|
| 2011/0044045 | A1* | 2/2011 | Kostka | F04D 29/005 362/253 |
| 2011/0165002 | A1* | 7/2011 | Noble | F04D 25/068 416/1 |
| 2013/0265750 | A1* | 10/2013 | Pickard | F21V 21/088 362/249.02 |
| 2015/0009666 | A1* | 1/2015 | Keng | F21V 33/0096 362/249.02 |
| 2015/0276207 | A1* | 10/2015 | Liu | F21V 33/0096 416/5 |
| 2016/0169503 | A1* | 6/2016 | Chen | F04D 25/088 362/382 |
| 2018/0279428 | A1* | 9/2018 | Deng | F21V 15/01 |
| 2020/0173446 | A1* | 6/2020 | Horng | F21V 21/096 |
| 2020/0362878 | A1 | 11/2020 | Li | |
| 2020/0408223 | A1* | 12/2020 | Kuramochi | F21V 29/773 |
| 2021/0048039 | A1* | 2/2021 | Allen | H02K 7/083 |
| 2021/0099048 | A1* | 4/2021 | Lin | H02K 5/26 |
| 2021/0215167 | A1* | 7/2021 | Mason | F04D 25/06 |

FOREIGN PATENT DOCUMENTS

| | | | |
|---|---|---|---|
| CN | 109026835 | A | 12/2018 |
| CN | 109114038 | A | 1/2019 |
| CN | 208750674 | U | 4/2019 |
| CN | 210196068 | U | 3/2020 |
| CN | 111623285 | A | 9/2020 |
| CN | 111623286 | A | 9/2020 |
| CN | 111997925 | A | 11/2020 |
| CN | 111997926 | A | 11/2020 |

OTHER PUBLICATIONS

CN109114038A_PartialTranslation (Chen, Z.) Jan. 1, 2019. [received on Dec. 20, 2023] Received from: STIC. (Year: 2019).*
International Search Report of PCT Application No. PCT/CN2021/102403 dated Sep. 8, 2021 with English translation, (6p).

* cited by examiner

FAN LAMP

CROSS REFERENCE TO RELATED APPLICATIONS

The present disclosure is a continuation of PCT patent application No. PCT/CN2021/102403 filed on Jun. 25, 2021 which claims the priority of the Chinese patent application No. 202010614970.6, filed to the Chinese patent office on Jun. 30, 2020, with a title of "Fan Lamp", and the priority of the Chinese patent application No. 202021250460.7, filed to the Chinese patent office on Jun. 30, 2020, with a title of "Fan Lamp", and the entire disclosures of the above-described applications are hereby incorporated by reference for all purposes.

TECHNICAL FIELD

The embodiments of the present disclosure relate to the technical field of lighting lamps, and in particular to a fan lamp.

BACKGROUND

Fan lamp is a common household appliance, which is a combination of a fan and a lamp. The fan and the lamp can be respectively controlled by switches, such that the fan lamp has the function of lighting as well as the blowing function of the fan.

The current commercially available fan lamp is improved from a traditional fan, and lighting lamp is stacked based on a traditional fan, the structures of the fan and the lighting lamp basically adopt the same general design as the traditional structure. This general design may lead to a relatively large overall size of the fan lamp, resulting in that the space occupied by the fan lamp after installation is large, which is also disadvantage for the transportation of the fan lamp.

SUMMARY

The present disclosure discloses a fan lamp, which can solve the problems of large space occupied by the fan lamp and inconvenient transportation.

In order to solve the above problems, the present disclosure adopts the following technical solutions:

A fan lamp, including a ceiling assembly, a hanger rod, a blade assembly, a light source assembly and a driver. The blade assembly includes a base plate, retractable blades and a driving motor. The retractable blades are rotatably installed on the base plate, the driving motor is connected to the base plate, and one end of the hanger rod is connected to the ceiling assembly, another end of the hanger rod is connected to a first end of the driving motor. The light source assembly is connected to a second end of the driving motor. And the light source assembly is located on a side of the blade assembly away from the ceiling assembly.

The driver is installed on the ceiling assembly, the blade assembly, or the light source assembly, and the driver is configured to be electrically connected to both the driving motor and the light source assembly.

BRIEF DESCRIPTION OF THE DRAWINGS

In order to more clearly illustrate the technical solutions in the embodiments of the present disclosure or the background technology, the drawings that need to be used in the embodiments or the background technology are briefly introduce below. Obviously, other drawings can also be obtained from these drawings without creative labor for persons skilled in the art.

DETAILED DESCRIPTION

Figure 1:
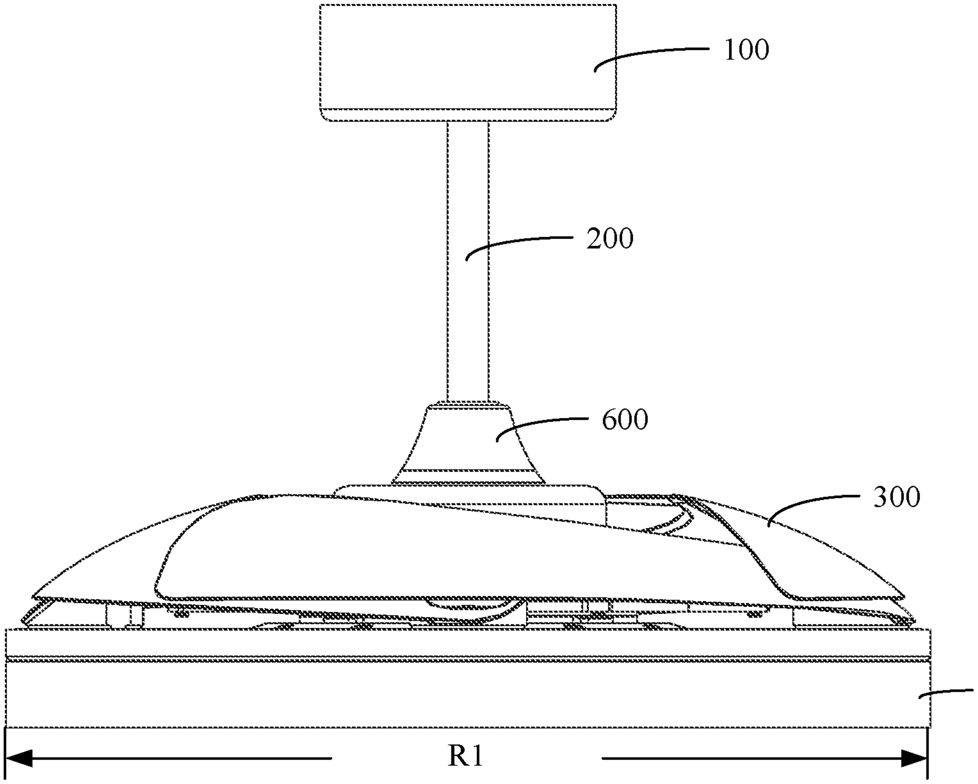
FIG. 1 is a schematic structural view of a fan lamp disclosed in an embodiment of the present application.
Figure 2:
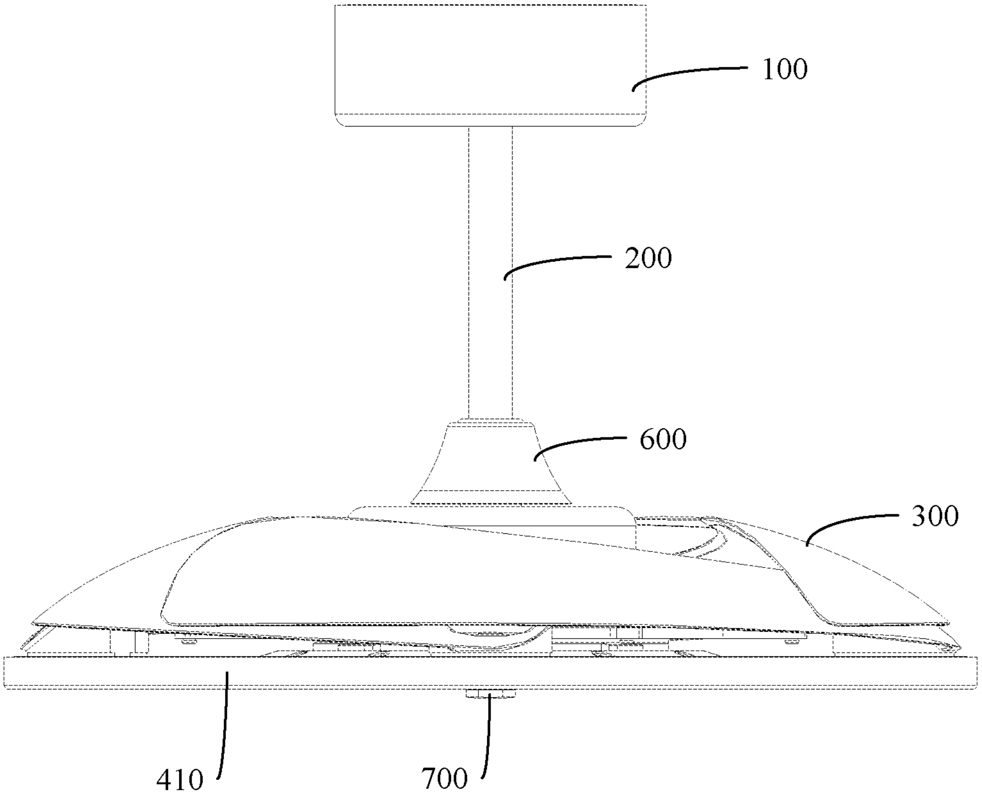
FIG. 2 is a schematic view of a partial structure of a fan lamp disclosed in an embodiment of the present application.
Figure 3:
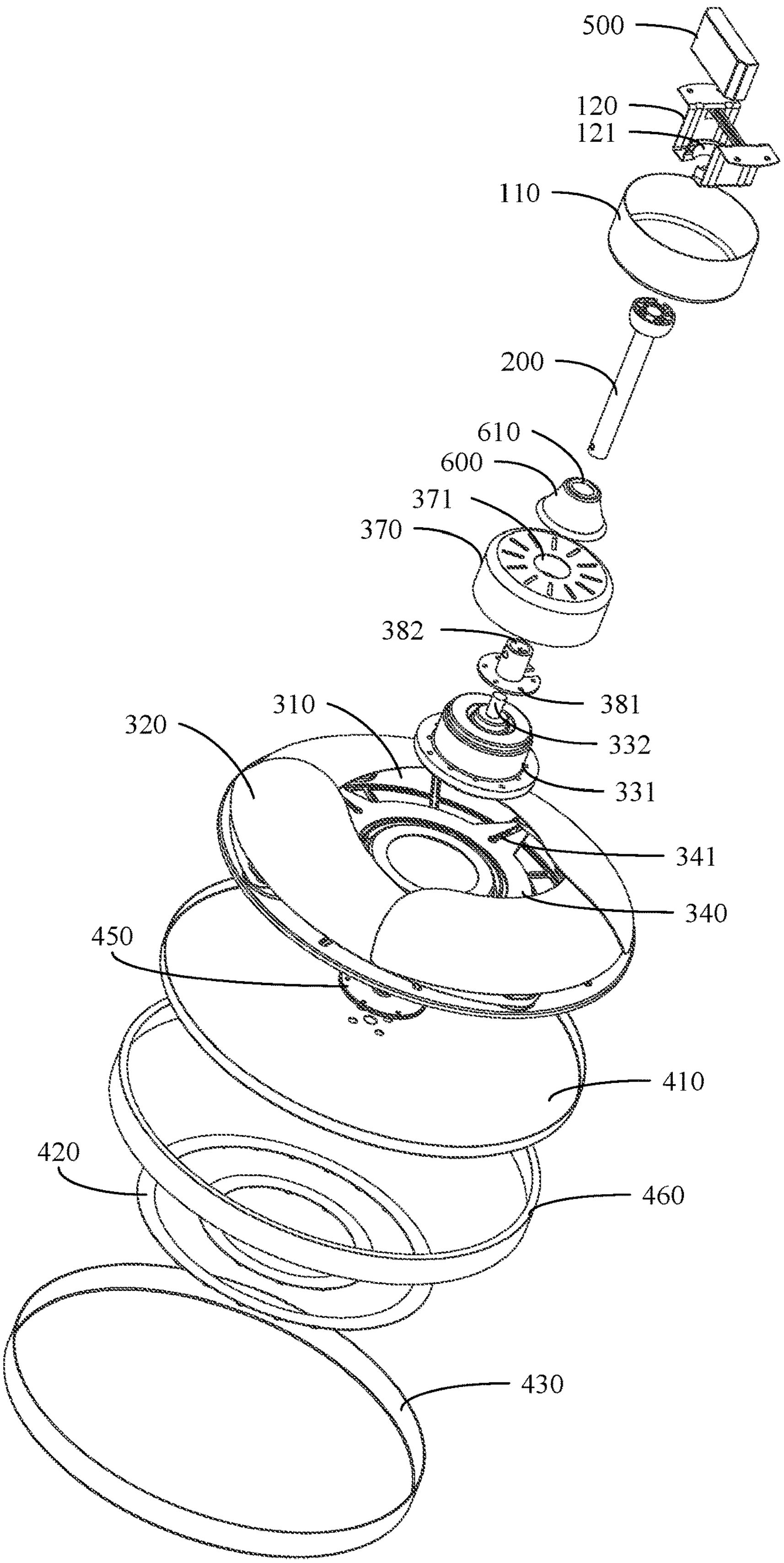
FIG. 3 is an exploded view of a fan lamp disclosed in an embodiment of the present application.
Figure 4:
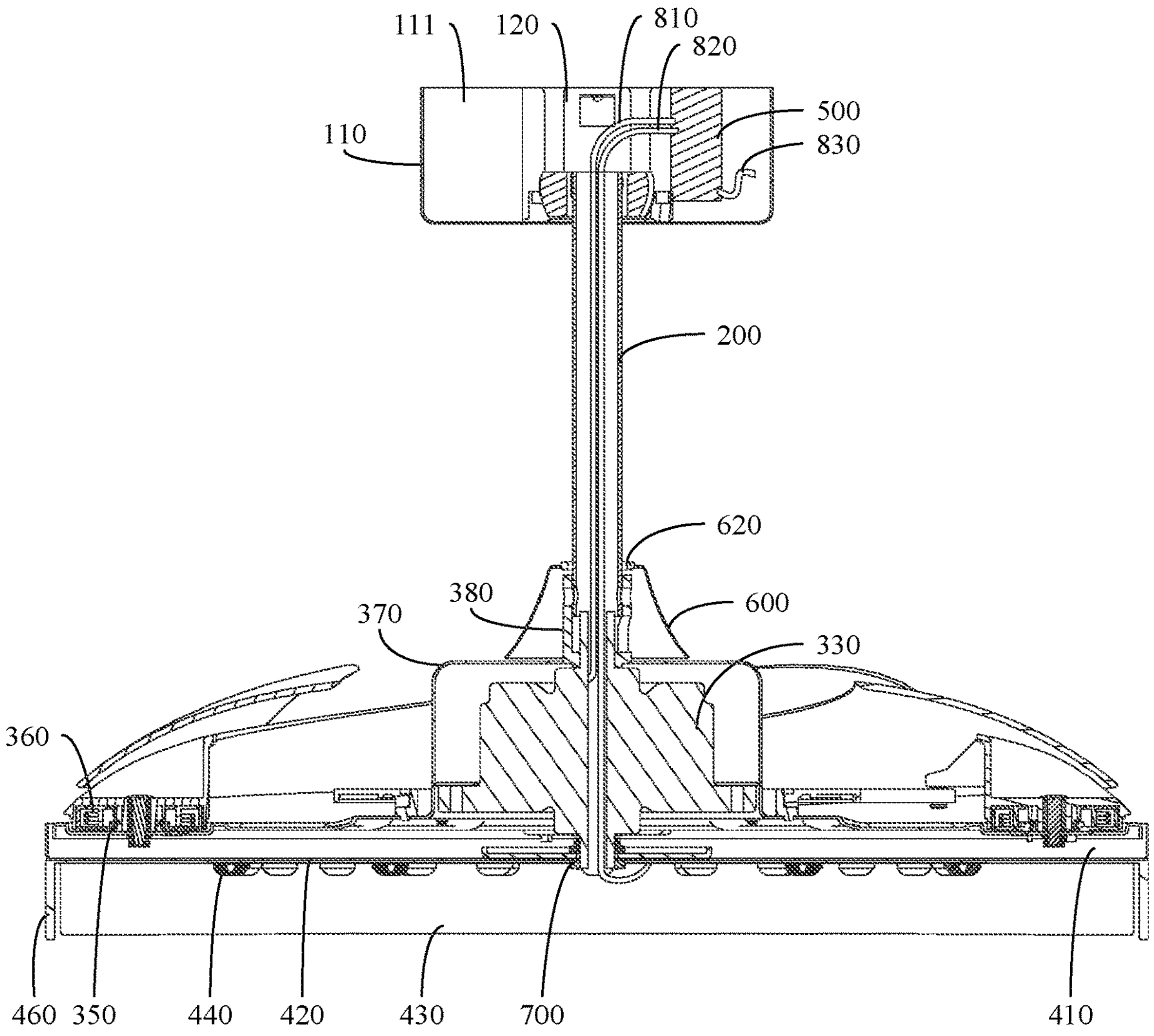
FIG. 4 is a cross-sectional view of a fan lamp disclosed in an embodiment of the present application.
Figure 5:
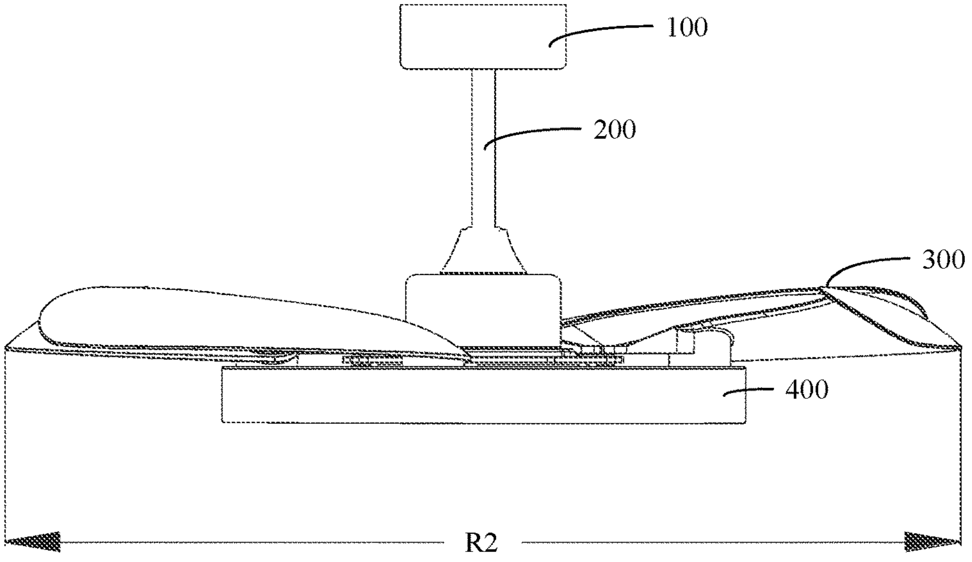
FIG. 5 is a schematic structural view of a fan lamp disclosed in an embodiment of the present application in the case where the retractable blades are expanded.
Figure 6:
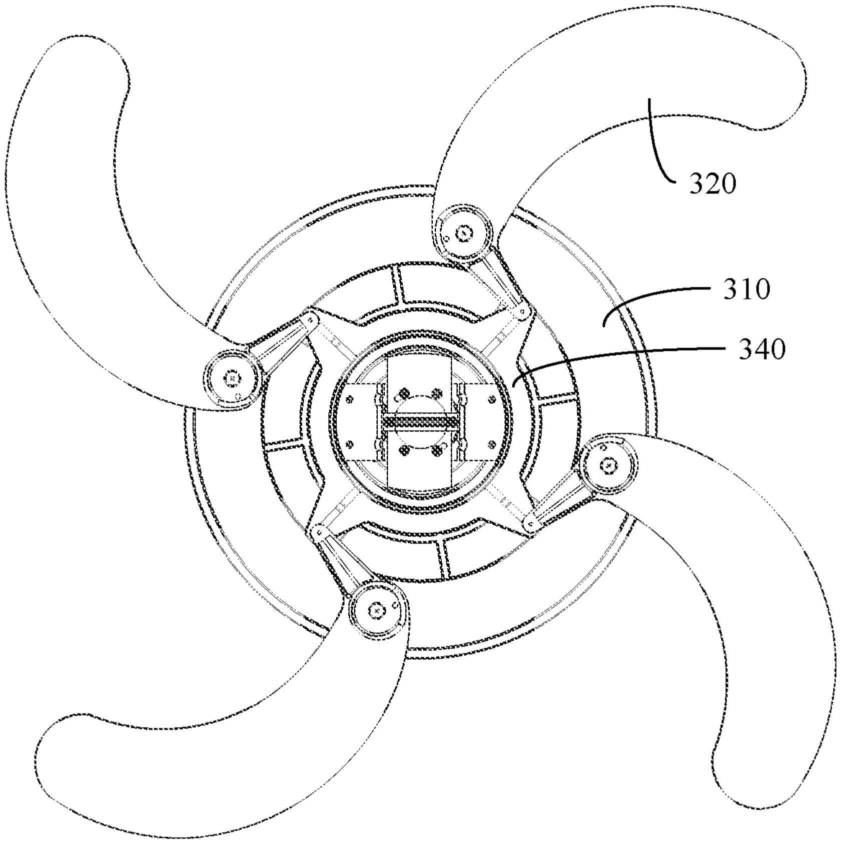
FIG. 6 is a top view of FIG. 5.

Numeral references of the drawings:

- 100: ceiling assembly, 110: ceiling box, 111: installation cavity, 120: hanger, 121: connection portion;
- 200: hanger rod;
- 300: blade assembly, 310: base plate, 320: retractable blade, 330: driving motor, 331: casing, 331*a*: upper cover, 331*b*: lower cover, 332: stator module, 333: rotor module, 334: first bearing, 335: second bearing, 340: synchronizer, 341: sliding slot, 350: installation base, 360: torsion spring, 370: motor cover, 371: third through hole, 380: connection piece, 381: positioning plate, 382: tubular body;
- 400: light source assembly, 410: bottom disc, 420: light source board, 430: light transmitting lampshade, 440: light emitting module, 450: installation disc, 460: decoration ring, 470: directional lighting module, 471: first light source plate, 472: first light emitting module, 472*a*: first light emitting unit, 472*b*: first light distribution element, 473: anti-glare lampshade, 480: flood lighting module, 481: second light source plate, 482: second light emitting module, 483: light homogenizing lampshade, 490: surface frame, 491: first accommodating hole, 492: second accommodating hole;
- 500: driver;
- 600: shielding cover, 610: fourth through hole, 620: elastic ring;
- 700: positioning piece;
- 810: first electrical connector, 820: second electrical connector, 830: electric supply connector In order to make the purpose, technical solutions and advantages of the present disclosure clearer, the technical solutions of the present disclosure will be clearly and completely described below with reference to the specific embodiments and the corresponding drawings of the present disclosure. Obviously, the described embodiments are only a part of the embodiments, instead of all embodiments of the present disclosure. Based on the embodiments of the present disclosure, all other embodiments obtained by those of ordinary skill in the art without creative efforts shall fall within the protection scope of the present disclosure.

The technical solutions disclosed by the various embodiments of the present disclosure are described in detail below with reference to the accompanying drawings.

Referring to FIG. 1 to FIG. 11, the embodiments of the present disclosure provide a fan lamp, which includes a ceiling assembly 100, a hanger rod 200, a blade assembly 300, a light source assembly 400 and a driver 500. The ceiling assembly 100 is used to realize the connection between the fan lamp and the installation base (e.g., the roof), thereby realizing the installation of the fan lamp. The hanger rod 200 may realize the connection between the blade assembly 300 and the ceiling assembly 100, that is, the length of the hanger rod 200 may be flexibly set. Optionally, the hanger rod 200 may adopt a multi-section structure, so that the user can adjust the length of hanger rod 200 according to their own needs, thereby changing the installation height of the fan lamp. The blade assembly 300 can realize the blowing function, and the light source assembly 400 can perform lighting, thereby making the fan lamp more functional. The driver 500 can supply power to the blade assembly 300 and the light source assembly 400, thereby ensuring reliable operation of the blade assembly 300 and the light source assembly 400.

The blade assembly 300 includes a base plate 310, retractable blades 320 and a driving motor 330. The retractable blades 320 are rotatably installed on the base plate 310, and the driving motor 330 is connected to the base plate 310, as such, the driving motor 330 can drive the base plate 310 to rotate, and the retractable blades 320 rotate relative to the base plate 310 under the action of centrifugal force, thereby realizing the expansion and retraction of the retractable blades 320. In an optional embodiment, in the case where the retractable blades 320 are retracted, the diameter R1 of the fan lamp may be 420 mm to 480 mm; in the case where the retractable blades 320 are expanded, the diameter R2 of the fan lamp may be 900 mm to 1200 mm. Optionally, the number of the retractable blades 320 may be at least two, the retractable blades 320 may be arranged along the circumferential direction of the base plate 310, and the respective retractable blades 320 may be simultaneously expanded or simultaneously retracted, as the number of the retractable blades 320 continues to increase, the cooling effect of the fan lamp is better.

The ceiling assembly 100 is connected to the blade assembly 300 through the hanger rod 200. Specifically, one end of the hanger rod 200 is connected to the ceiling assembly 100, while the other end of the hanger rod 200 is connected to a first end of the driving motor 330. The light source assembly 400 is connected to the blade assembly 300, specifically, the light source assembly 400 is connected to a second end of the driving motor 330, and the light source assembly 400 is located on a side of the blade assembly 300 away from the ceiling assembly 100. In such a scheme, the blade assembly 300 and the light source assembly 400 are connected through the driving motor 330, and no additional connecting structure is required to connect the blade assembly 300 and the light source assembly 400 together, therefore, this kind of fan lamp contains fewer components and parts, the entire fan lamp is more compact and occupies smaller space.

The driver 500 is installed on the ceiling assembly 100, the blade assembly 300 or the light source assembly 400, that is, the driver 500 may be installed by utilizing the structure of the ceiling assembly 100, the blade assembly 300 or the light source assembly 400, such that the space additionally occupied by the driver 500 is smaller, and even no additional space is occupied by the driver 500, thereby making the structure of the fan lamp more compact. In an optional embodiment, the driver 500 is electrically connected to at least one of the blade assembly 300 and the light source assembly 400, so as to realize the driving of at least one of the blade assembly 300 and the light source assembly 400. In the case where the driver 500 is electrically connected to the light source assembly 400, the light source assembly 400 can be driven to emit light, thereby realizing the lighting function of the fan lamp. In the case where the driver 500 is electrically connected to the blade assembly 300, the retractable blades 300 can be driven to expand, while the entire blade assembly 300 can be driven to rotate, thereby realizing the blowing function of the fan lamp. In the case where the driver 500 is electrically connected to both the blade assembly 300 and the light source assembly 400, the blade assembly 300 can be driven to rotate and the light source assembly 400 can be driven to emit light at the same time, thereby simultaneously realizing the blowing function and the lighting function of the fan lamp.

Further, the driver 500 may be configured to be electrically connected to both the driving motor 330 and the light source assembly 400. Optionally, the driver 500 is electrically connected to the driving motor 330 through a first electrical connector 810, and the driver 500 is electrically connected to the light source assembly 400 through a second electrical connector 820. In addition, the driver 500 may be connected to the electric supply through an electric supply connector 830. Herein, the first electrical connector 810, the second electrical connector 820 and the electric supply connector 830 may all select conductive wires. In this case, the driver 500 may be integrated, and the same one driver 500 may simultaneously supply power to the driving motor 330 and the light source assembly 400, and the required number of the driver(s) 500 is naturally reduced. Optionally, the driver 500 may be set as one, and in the case where the power consumption of the fan lamp is relatively large, two or even more drivers 500 may also be set, and each driver 500 is configured to be electrically connected to both the driving motor 330 and the light source assembly 400.

In the fan lamp disclosed in the embodiments of the present disclosure, the driving motor 330 of the blade assembly 300 and the light source assembly 400 may be electrically connected to the same one driver 500, such that the blade assembly 300 and the light source assembly 400 can be driven by the same one driver 500, compared to the method in which the blade assembly 300 and the light source assembly 400 are driven by their respective drivers, the number of components and parts of the fan lamp disclosed in the embodiment of the present disclosure is reduced, therefore, the space occupied by the fan lamp is smaller, which is convenient for the transportation of the fan lamp.

In an optional embodiment, the ceiling assembly 100 includes a ceiling box 110, the ceiling box 110 has an installation cavity 111, and the driver 500 is installed in the installation cavity 111. In this case, the driver 500 is installed by using the installation cavity 111 in the ceiling box 110, and the driver 500 substantially does not occupy additional space, thereby making the structure of the fan lamp more compact.

Further, the ceiling assembly 100 further includes a hanger 120 installed in the installation cavity 111, the hanger 120 is installed in the installation cavity 111, the ceiling box 110 is fixedly connected to the hanger 120, and the ceiling box 110 may be installed to the installation base through the hanger 120. The hanger 120 may adopt a U-shaped structure, the hanger 120 is provided with a connection portion 121, the connection portion 121 has a connection hole and a first spherical surface, the hanger rod 200 has a second spherical surface, one end of the hanger rod 200 passes through the connection hole, and the first spherical surface is attached to the second spherical surface, and through the match of the first spherical surface and the second spherical surface, the position of the hanger rod 200 relative to the hanger 120 may be changed, thereby facilitating the installation of the fan lamp.

The driver 500 is installed between the lateral surface of the hanger 120 and the inner wall of the ceiling box 110. That is to say, there is an interval between the lateral surface of the hanger 120 and the inner wall of the ceiling box 110, and the driver 500 may be arranged by using the interval, such that the driver 500 can be installed by taking full use of the installation cavity in the ceiling box 110, such that the structure of the fan lamp is more compact.

Figure 7:
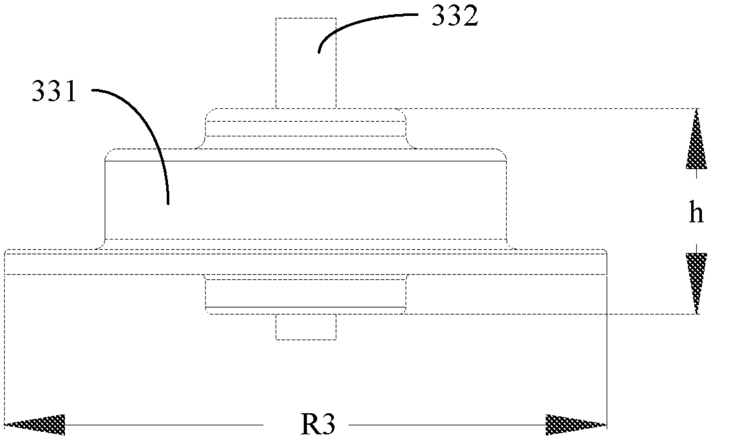
FIG. 7 is a schematic structural view of a driving motor disclosed in an embodiment of the present application.
Figure 8:
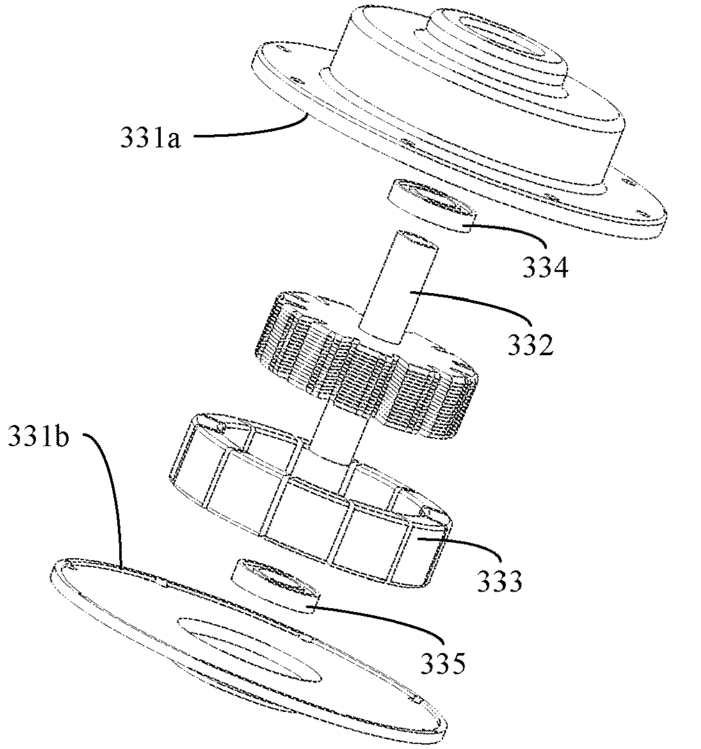
FIG. 8 is an exploded view of a driving motor disclosed in an embodiment of the present application.
Figure 9:
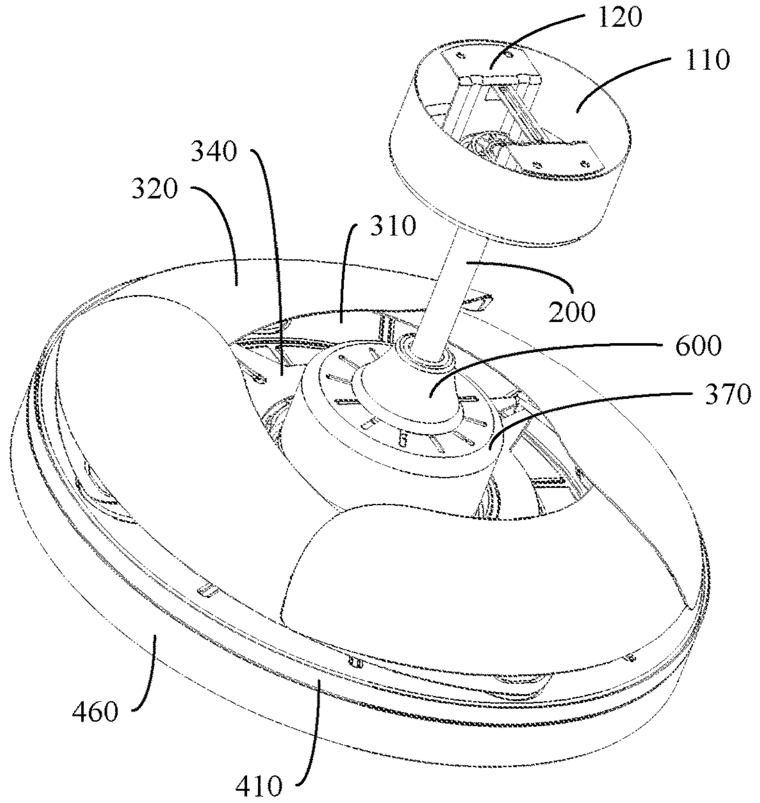
FIG. 9 is a schematic structural view of a fan lamp disclosed in another embodiment of the present application.
Figure 10:
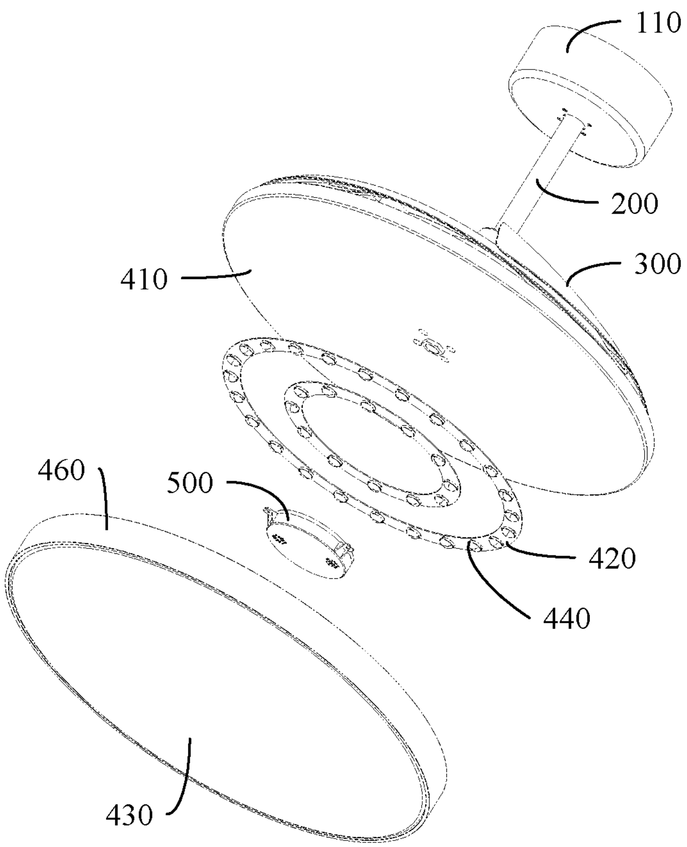
FIG. 10 is an exploded view of the fan lamp shown in FIG. 9.
Figure 11:
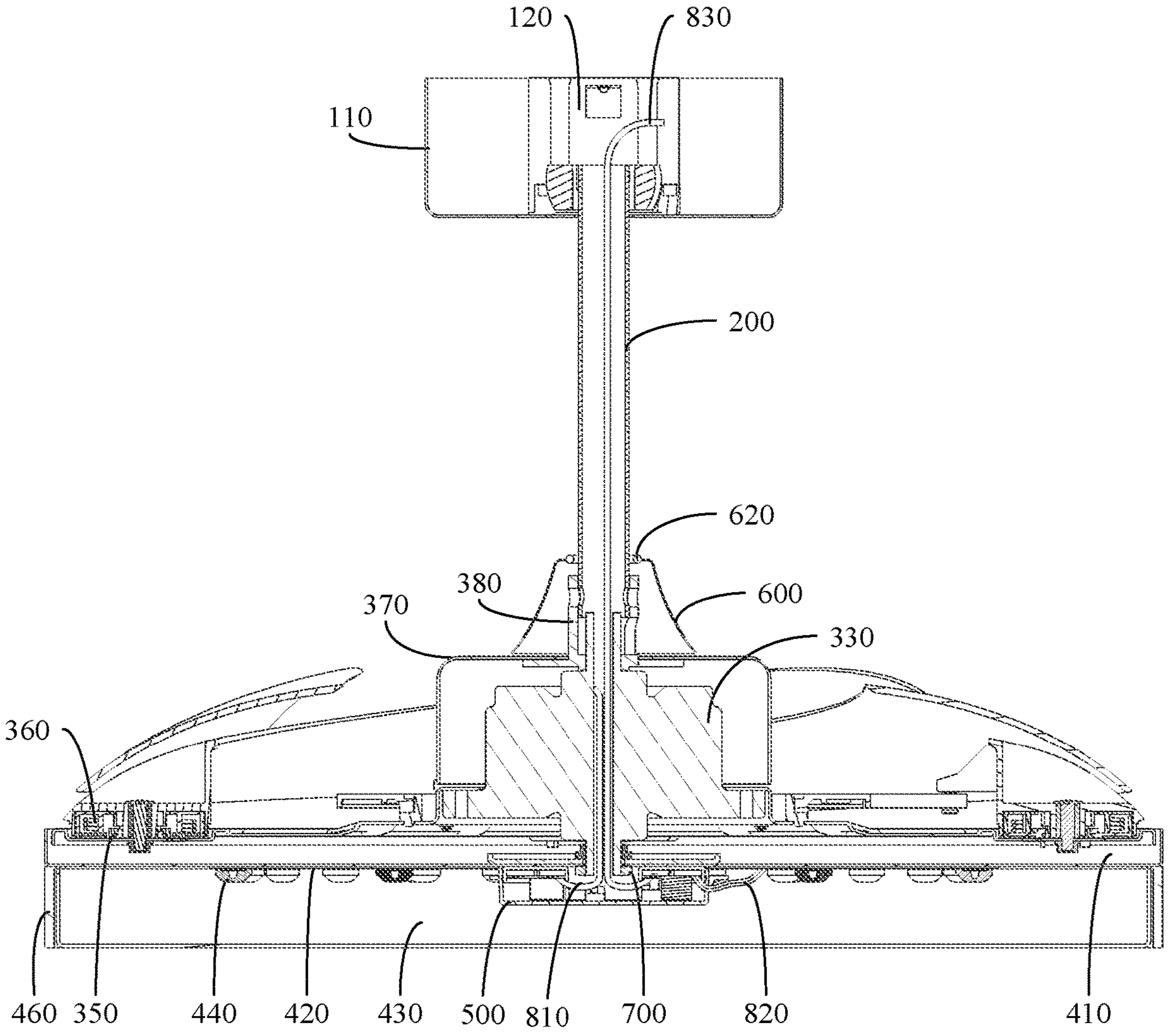
FIG. 11 is a cross-sectional view of the fan lamp shown in FIG. 9.
Figure 12:
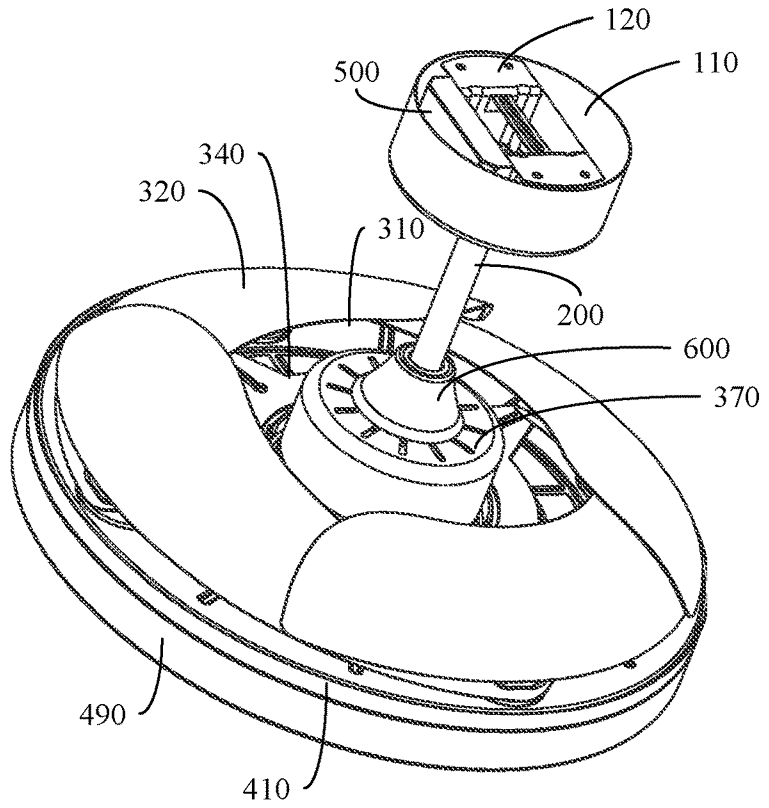
FIG. 12 is a schematic structural view of a fan lamp disclosed in yet another embodiment of the present application.
Figure 13:
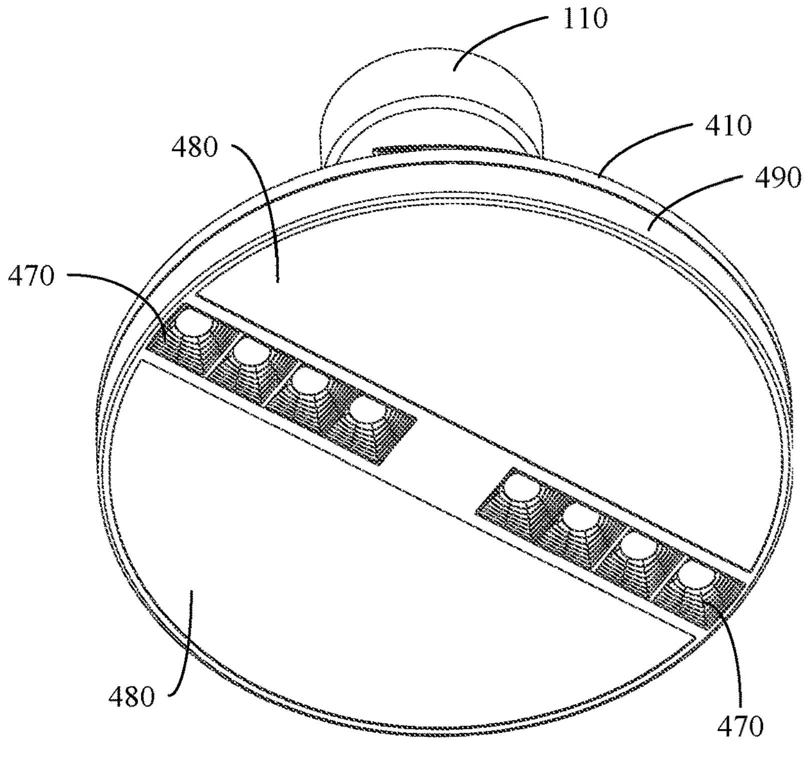
FIG. 13 is a schematic structural view of the fan lamp shown in FIG. 12 from another viewing angle.
Figure 14:
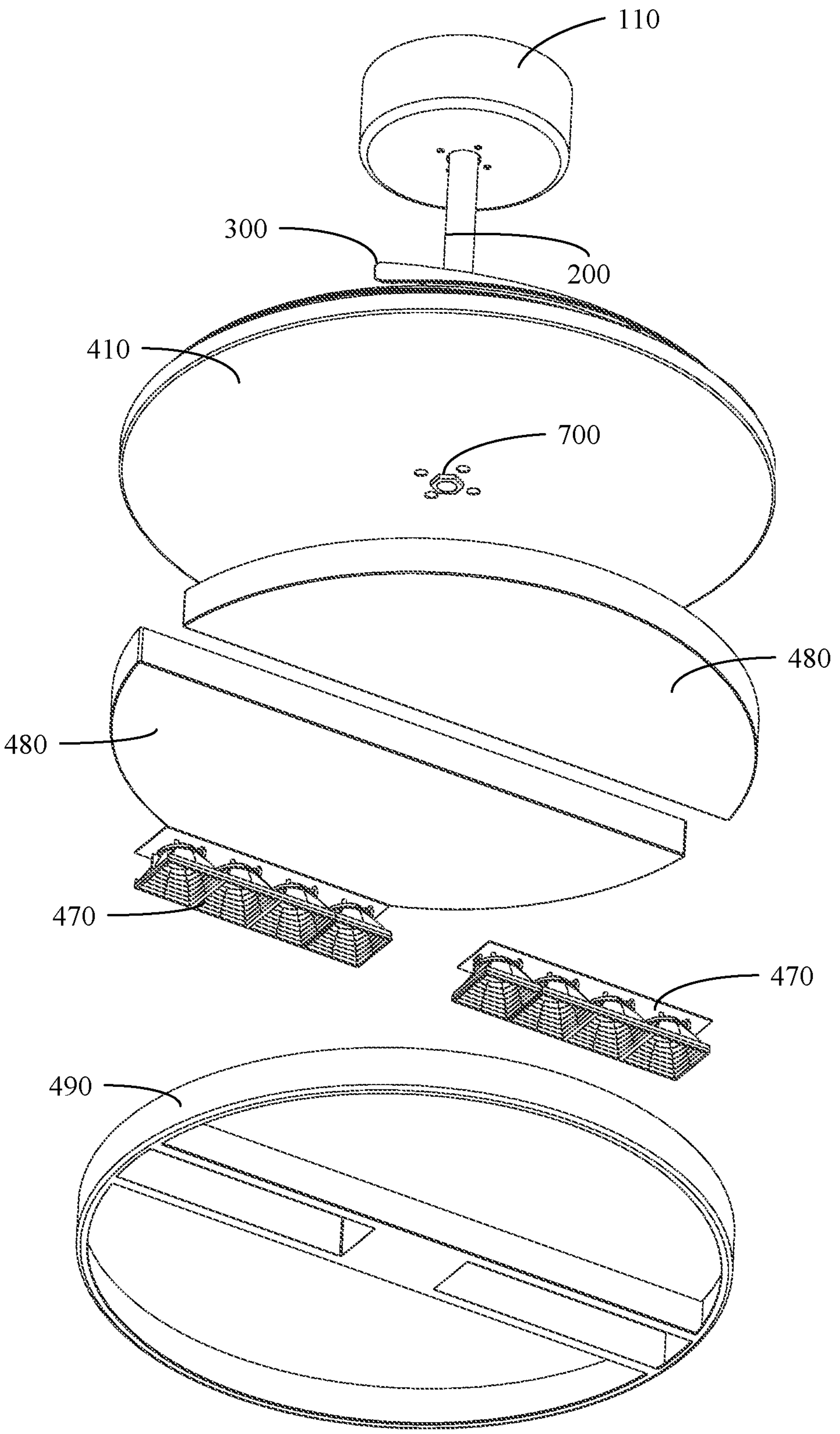
FIG. 14 is an exploded view of the fan lamp shown in FIG. 12.
Figure 15:
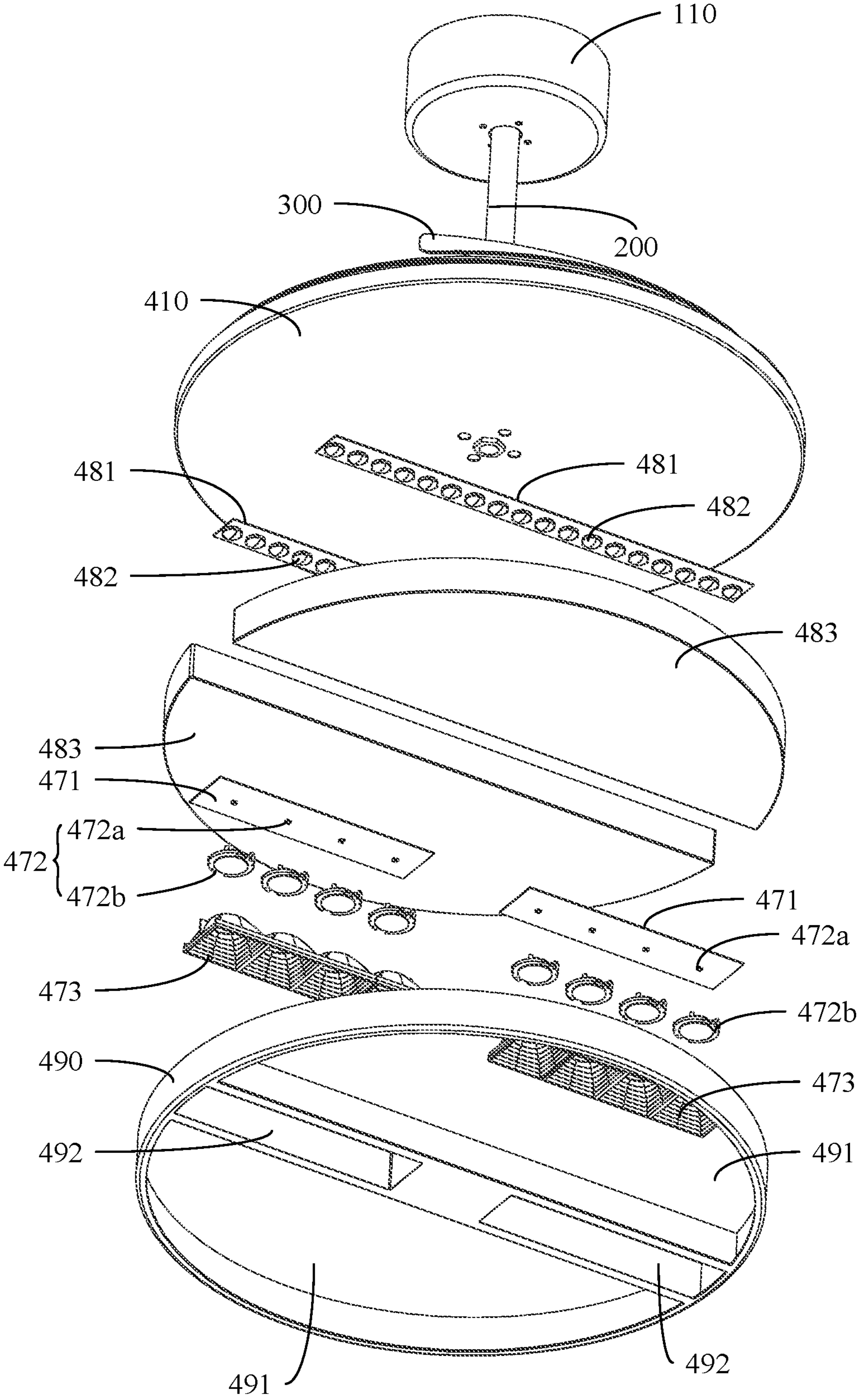
FIG. 15 is another exploded view of the fan lamp shown in FIG. 12.

Optionally, the driving motor 330 may include a casing 331, a stator module 332, a rotor module 333, a first bearing 334 and a second bearing 335, and the casing 331 may include an upper cover 331*a* and a lower cover 331*b*, which are detachably connected to form a space for accommodating the stator module 332 and the rotor module 333. The stator module 332 is matched with the upper cover 331*a* through the first bearing 334, and is matched with the lower cover 331*b* through the second bearing 335. Optionally, as shown in FIG. 7, the outer diameter R3 of the driving motor 330 may be 110 mm to 130 mm, preferably about 120 mm, and the height h of the driving motor 330 may be 40 mm to 50 mm, preferably about 45 mm, and the structure of such kind of driving motor 330 is more compact, and occupies smaller space.

Two ends of the stator module 332 are respectively connected to the hanger rod 200 and the light source assembly 400, the rotor module 333 is connected to the casing 331, and the casing 331 is connected to the base plate 310. In the case where the driving motor 330 is energized, an acting force is generated between the stator module 332 and the rotor module 333, the stator module 332 is fixed, and the rotor module 333 may rotate relative to the stator module 332, thereby driving the casing 331 to rotate, the casing 331 then drives the base plate 310 to rotate, thereby realizing the expansion of the retractable blades 320. In such a scheme, the base plate 310 is driven by the casing 331 to rotate, and the casing 331 is more stable while rotating, and has a stronger ability to bear the acting force. Therefore, the driving motor 330 has a higher transmission efficiency and a longer service life.

The stator module 332 is provided with a first through hole, the hanger rod 200 is provided with a second through hole, the first electrical connector 810 passes through the second through hole, and is electrically connected to the stator module 332 and the rotor module 333, and the second electrical connector 820 sequentially passes through the second through hole and the first through hole, and is electrically connected to the light source assembly 400. After the first through hole and the second through hole are disposed, the stator module 332 and the hanger rod 200 can bypass the first electrical connector 810 and the second electrical connector 820, so as to facilitate the electrical connection of the driver 500 to the driving motor 330 and the light source assembly 400; meanwhile, the first through hole and the second through hole can properly limit the positions of the first electrical connector 810 and the second electrical connector 820, such that the first electrical connector 810 and the second electrical connector 820 are not easy to interfere with other components, such that the fan lamp operate more reliably.

In order to protect the driving motor 330, the blade assembly 300 may further include a motor cover 370, the motor cover 370 is disposed to cover the exterior of the casing 331, and the motor cover 370 may cover the driving motor 330, so as to protect the driving motor 330. Further, the blade assembly 300 may further include a connection piece 380, the connection piece 380 is connected to the motor cover 370, one end of the connection piece 380 is connected to the hanger rod 200 by insertion, and one end of the stator module 332 extends into the connection piece 380. In this embodiment, the hanger rod 200 and the stator module 332 are connected together through the connection piece 380, because the connection piece 380 and the hanger rod 200 adopt the insertion connecting manner, which is more convenient to operate, meanwhile, the connection piece 380 and the hanger rod 200 are detachably connected, which is convenient for the maintenance of the fan lamp.

The above-described connection piece 380 and the motor cover 370 may adopt an integrated structure, however, in order to facilitate the installation and maintenance of the fan lamp, the motor cover 370 may be provided with a third through hole 371, and the connection piece 380 includes a positioning plate 381 and a tubular body 382, the positioning plate 381 may be positioned and matched with the motor cover 370, one end of the tubular body 382 is connected to the positioning plate 381, and the other end of the tubular body 382 passes through the third through hole 371 and is connected to the hanger rod 200 through insertion. Such a structure can not only ensure the reliable connection between the connection piece 380 and the motor cover 370, but also make them detachable, thereby facilitating the installation and maintenance of the fan lamp.

In order to improve the connection strength of the hanger rod 200 and the connection piece 380, one end of the hanger rod 200 is threadedly connected to the tubular body 382, and the tubular body 382 is disposed with a first insertion hole, and the hanger rod 200 is provided with a second insertion hole, a latch is disposed at the first insertion hole and the second insertion hole. Through adopting this connection method, at least one of the hanger rod 200 and the connection piece 380 can be rotated, such that the hanger rod 200 and the connection piece 380 are threadedly matched together, and gradually inserted and connected. In this connection method, the hanger rod 200 and the connection piece 380 are connected together more reliably through insertion and threadedly match. Meanwhile, in the case where the hanger rod 200 and the connection piece 380 are rotated to a predetermined position, the first insertion hole and the second insertion hole are aligned, and the latch is inserted into the first insertion hole and the second insertion hole, and the latch can assist in limiting the relative rotation between the hanger rod 200 and the connection piece 380, such that the hanger rod 200 and the connection piece 380 are not easy to loosen due to relative rotation, even if the blade assembly 300 of the fan lamp rotates, thereby making the structural strength of the fan lamp is higher.

The above-described connection piece 380 may be in a bare state, while the latch is also in a bare state, which is not only unsightly, but also has the risk that the latch is easily disassembled by mistake. Therefore, in order to solve this problem, the fan lamp further includes a shielding cover 600, the shielding cover 600 is disposed on and covers the exterior of the latch, the shielding cover 600 can separate the latch and the connection piece 380 from the external environment, thereby improving the aesthetics of the fan lamp, meanwhile, in the case where the user needs to disassemble the hanger rod 200 and the connection piece 380, the shielding cover 600 must be removed first, thereby reducing the risk of the latch being disassembled by mistake. Optionally, in order to simplify the disassembly and assembly operations of the shielding cover 600, the shielding cover 600 can be sleeved on the exterior of the hanger rod 200, and can flexibly move relative to the hanger rod 200, and can cover structures such as latch under the action of its own gravity.

In a further embodiment, the shielding cover 600 is provided with a fourth through hole 610, and an elastic ring 620 is disposed at the fourth through hole 610, and the elastic ring 620 surrounds the hanger rod 200. The elastic ring 620 here may fill the gap between the hanger rod 200 and the fourth through hole 610, and the elastic ring 620 may be deformed after being stressed, the elastic ring 620 may reduce the gap between the hanger rod 200 and the fourth through hole 610, meanwhile, in the case where the elastic ring 620 is in contact with the hanger rod 200, the elastic ring 620 is deformed, so as to be more closely matched with the hanger rod 200, and the sealing effect is further improved. In addition, the elastic ring 620 may be deformed after being stressed, so as to achieve buffering, and prevent the components and parts of the fan lamp from being noisy and short in service life due to rigid collision.

In an optional embodiment, the fan lamp further includes a positioning member 700, the light source assembly 400 includes a bottom disc 410, a light source plate 420 and a light transmitting lampshade 430, the bottom disc 410 and the light transmitting lampshade 430 are connected to each other, and form a first optical cavity, the light source plate 420 is installed in the first optical cavity, and a plurality of light emitting modules 440 are disposed on the light source plate 420 and are spaced apart from each other. The light emitting module 440 includes a light emitting unit and a light distribution element, and the light distribution element is disposed on and covers the exterior of the light emitting unit. The second end of the driving motor 330 extends into the first optical cavity, the positioning member 700 is installed on the second end of the driving motor 330, and located in the first optical cavity. The positioning member 700 is positioned and matched with the bottom disc 410. In this embodiment, the connection between the driving motor 330 and the light source assembly 400 can be realized through the positioning member 700. This connection method has a simpler structure and can simplify the connection operation of the driving motor 330 and the light source assembly 400 at the same time.

Optionally, the positioning member 700 may be a nut, and the positioning member 700 may be threadedly matched with the second end of the driving motor 330, so as to further simplify the connecting operation of the driving motor 330 and the light source assembly 400.

Optionally, in the case where the driver 500 is installed to the light source assembly 400, the driver 500 may be further installed in the above-described first optical cavity. The first optical cavity here has a larger space, and is thus more convenient to set the driver 500. Meanwhile, if the driver 500 needs to be disassembled, the driver 500 can be directly seen just by opening the light transmitting lampshade 430, therefore, this structure is more convenient to maintain the driver 500.

The above-described driver 500 and light source plate 420 are both located in the first optical cavity, and both are disposed closely adjacent to the bottom disc 410, therefore, they are easy to structurally interfere with each other. In one embodiment, the driver 500 may be stacked on the light source plate 420, but this structure may cause the part of the light source plate 420 blocked by the driver 500 to be unable to work, thereby resulting in structural waste, as well as causing the space commonly occupied by the light source plate 420 and the driver 500 to be larger. Based on this, in another embodiment, the light source plate 420 is a ring-shaped plate with an inner hole, and at least a part of the driver 500 is located in the inner hole. In this embodiment, the light source plate 420 can bypass the driver 500, such that the entire structure of the light source plate 420 can be used, while the driver 500 can be installed using the space occupied by the light source plate 420, thereby making the structure of the fan lamp more compact.

The retractable blades 320 of the blade assembly 300 can be expanded or retracted. In the case where the retractable blades 320 are in a retracted state, the retractable blades 320 do not work, and the space occupied by the blade assembly 300 would affect the aesthetics of the entire fan lamp. Based on this, the direction parallel to the hanger rod 200 is defined as a first direction, in the case where the retractable blades 320 are in the retracted state, the orthographic projections of the retractable blades 320 along the first direction is located within the orthographic projection of the bottom disc 410 along the first direction. That is, in the retracted state, the edges of the retractable blades 320 do not extend beyond the edge of the bottom disc 410, so that the space occupied by the retractable blades 320 in this state is as small as possible, thereby optimizing the structural compactness of the fan lamp.

In an optional embodiment, the light source assembly 400 further includes an installation disc 450, the installation disc 450 is disposed between the blade assembly 300 and the bottom disc 410, the second end of the driving motor 330 passes through the installation disc 450, and the installation disc 450 and the bottom disc 410 abut against each other. Because the blade assembly 300 would rotate during operation, while the light source assembly 400 is fixed, the blade assembly 300 and the light source assembly 400 can be better separated by the installation disc 450, meanwhile, the blade assembly 300 can be prevented from driving the light source assembly 400 to rotate, so as to achieve the purpose of improving the reliability of the fan lamp during operation. In addition, the installation disc 450 abuts against the bottom disc 410, which can better limit the shaking of the bottom disc 410, and prevent the bottom disc 410 from shaking slightly due to the movement of the blade assembly 300, thereby improving the user experience while using the fan lamp.

In order to improve the appearance quality of the fan lamp, the light source assembly 400 further includes a decoration ring 460, and the decoration ring 460 is disposed on the outer peripheral surface of the light transmitting lampshade 430. The material, shape and other structural parameters of the decoration ring 460 can be designed according to the user's preference, thereby improving the appearance quality of the entire fan lamp.

As described above, the number of the retractable blades 320 may be at least two, while the base plate 310 rotates, each retractable blade 320 is expanded under the action of centrifugal force. However, due to the influence of factors such as processing error, assembly error, etc., the expansion ranges and speeds of the respective retractable blades 320 may be different, which leads to a great occasionality of the heat dissipation effect of the blade assembly 300. Based on this, in an optional embodiment, the blade assembly 300 further includes a synchronizer 340 and installation bases 350. The synchronizer 340 is rotatably installed on the base plate 310, and the rotation center of the synchronizer 340 is coincident with the rotation center of the base plate 310. The plurality of retractable blades 320 are rotatably installed on the base plate 310 through a plurality of installation bases 350, the synchronizer 340 is provided with a plurality of sliding slots 341, and the installation bases 350 are provided with protruding parts, and the protruding parts of the respective installation bases 350 are in one-to-one correspondence with and slidably fitted with the respective sliding slots 341. While the base plate 310 rotates, the synchronizer 340 rotates along with it, under the action of the plurality of sliding slots 341 and the plurality of protruding parts, the respective retractable blades 320 can be expanded synchronously, thereby overcoming the influence of factors such as processing errors, assembly errors, etc., such that the heat dissipation effect of the blade assembly 300 can more reliably approach the design value, thereby improving the blowing effect thereof. Meanwhile, the structure can also promote the acting force of the fan lamp to be distributed more evenly, and prevent the fan lamp from shaking due to uneven distribution of the acting force.

In order to retract the retractable blades 320 more reliably, the blade assembly 300 may further include torsion springs 360, each of which has one end connected to the base plate 310, and the other end connected to the retractable blade 320. Specifically, the torsion springs 360 may be installed on the installation base 350. While the retractable blades 320 are expanded, the torsion springs 360 are deformed as being subjected to the acting force from the retractable blades 320. While the blade assembly 300 stop working, as the centrifugal force it receives disappears, the force of the retractable blades 320 acting on the torsion springs 360 also disappears, and the torsion springs 360 can thus restore from deformation, thereby applying a reaction force on the retractable blades 320, such that the retractable blades 320 retract relative to the base plate 310, until the retractable blades 320 retract in place. The space occupied by the torsion springs 360 is small, which is advantage for realizing the compact design of the fan lamp.

Optionally, the driver 500 includes a circuit board, and the circuit board is disposed with an input end, a first output end and a second output end, the first output end is electrically connected to the driving motor 330, and the second output end is electrically connected to the light source assembly 400. The circuit board here may realize the control of the fan lamp, that is to say, the driving part and the control part of the fan lamp can be designed in an integrated manner, such that the structure of the fan lamp is more compact.

In some other embodiments, as shown in FIG. 12 to FIG. 15, the light source assembly 400 may include a bottom disc 410 and a directional lighting module 470, and the bottom disc 410 may provide an installation basis for the directional lighting module 470, the blade assembly 300 or other components of the fan lamp, the directional lighting module 470 is installed on the bottom disc 410. The directional lighting module 470 can emit light and lighting while being driven, such that the fan lamp has the lighting function. The lighting area of the directional lighting module 470 described here is relatively concentrated, therefore, the region that need to be spotlighted can be lighted.

In the fan lamp disclosed in the embodiment of the present disclosure, the light source assembly 400 includes a directional lighting module 470, and the directional lighting module 470 can perform directional lighting on key regions, and the user can control the working state of the directional lighting module 470 according to actual needs, so as to satisfy their own lighting requirements. It can be seen that, the fan lamp can perform directional lighting on key regions, such that the lighting effect of the fan lamp is better.

In an optional embodiment, the directional lighting module 470 includes a first light source plate 471 and at least one first light emitting module 472, the first light source plate 471 is installed on the bottom disc 410, and the first light emitting module 472 is installed on the first light source plate 471, the first light emitting module 472 includes a first light emitting unit **472*a* and a first light distribution element 472*b*, and the first light distribution element 472*b* is disposed on and covers the exterior of the first light emitting unit 472*a*. The first light emitting unit 472*a* can emit light, and the light emitted from the first light emitting unit 472*a* enters the first light distribution element 472*b*, the first light distribution element 472*b* may change the propagation direction of the light to realize light distribution, thereby adjusting the lighting angle of the directional lighting module 470**, so as to achieve the lighting effect that the user wants.

Optionally, the number of the first light emitting module (s) 472 may be one or at least two. In the case where the number of the first light emitting module(s) 472 is at least two, the respective first light emitting modules 472 may be arranged as being spaced apart from each other, such that the emitted light is more uniform, thereby improving the lighting effect of the fan lamp.

Further, the first light distribution element **472*b* may be a lens, such as a convex lens or a concave lens, or may be a combination of a convex lens and a concave lens. The first light distribution element 472*b* may condense the light, such that the light is concentrated in a relatively small region, thereby improving the light effect of the directional lighting module 470**.

In order to avoid the problem of glare while the directional lighting module 470 lighting, in an optional embodiment, the directional lighting module 470 further includes an anti-glare lampshade 473, and the anti-glare lampshade 473 is connected to the first light distribution element **472*b*. The anti-glare lampshade 473 here may further adjust the propagation direction of the light, so as to achieve the purpose of anti-glare, thereby improving the comfort of the user while using the fan lamp. For example, the light emitted from the first light emitting unit 472*a* enters the first light distribution element 472*b*, after the light is redistributed by the first light distribution element 472*b*, a part of the light within the light output range is irradiated on the lighting area of the directional lighting module 470, and the other part of the light that is not within the light output range can be absorbed by the anti-glare lampshade 473, therefore, in the case where the user is in a region outside the light output range, the brightness difference between the lighting area of the directional lighting module 470 and the region outside the lighting area is small, and intense light of the first light emitting unit 472*a* would not be directly irradiated on the human eye, thereby preventing the user from feeling dazzled and uncomfortable. Meanwhile, the connection of the anti-glare lampshade 473 and the first light distribution element 472***b* can also improve the aesthetics of the directional lighting module 470.

Further, the anti-glare lampshade 473 may be a tapered mask, and both ends of the anti-glare lampshade 473 are open ends. The taper of such a tapered mask can be controlled more accurately, which is convenient for adjusting the structural parameters of the anti-glare lampshade 473, thereby helping to improve the anti-glare effect of the anti-glare lampshade 473. In addition, the tapered mask is easier to process, making the anti-glare lampshade 473 easier to be shaped, and the cost is lower.

The optical parameters of the above-described anti-glare lampshade 473 can be flexibly set, so as to improve the anti-glare effect of the anti-glare lampshade 473, the cone angle of the anti-glare lampshade 473 may be smaller than 37°, such a configuration may further reduce the lighting range of light that is not within the light output range, thereby reducing the impact of glare on the user, and achieving the purpose of improving the anti-glare effect.

In an optional embodiment, the color rendering index of the first light emitting unit 472*a* is greater than or equal to 90. In the case where the color rendering index of the first light emitting unit 472*a* is greater than or equal to 90, the light emitted by the first light emitting unit 472*a* has a higher degree of color reproduction of the irradiated object, and the color of the object that is irradiated by the light emitted by the first light emitting unit 472*a* is closer to its true color, thereby enhancing the lighting effect of the directional lighting module 470.

Fan lamp can be used in various circumstances, such as lighting for dining table area, tea table area, sofa area, bar area, etc. In order to meet different usage needs of users, in an optional embodiment, the light source assembly 400 further includes a flood lighting module 480, the flood lighting module 480 is installed on the bottom disc 410, and the directional lighting module 470 and the flood lighting module 480 are both located on the same side of the bottom disc 410. The flood lighting module 480 here can light a larger area, so as to achieve the effect of flood lighting. The directional lighting module 470 and the flood lighting module 480 can be used separately or together. In the case where the user needs to perform directional lighting on key areas, the directional lighting module 470 can be used; in the case where the user needs to perform atmosphere lighting on a large area, the flood lighting module 480 can be used. It can be seen that, in this embodiment, the directional lighting module 470 and the flood lighting module 480 are both set, so that the fan lamp has at least two lighting modes, and the user can change the working states of the directional lighting module 470 and the flood lighting module 480 according to different usage, thereby improving the lighting effect of the fan lamp.

Further, the lighting angle of the directional lighting module 470 is smaller than that of the flood lighting module 480, so that the light emitting range of the directional lighting module 470 is smaller than the light emitting range of the flood lighting module 480. Therefore, the directional lighting module 470 can form a relatively smaller lighting area, thereby achieving directional lighting, while the flood lighting module 480 can form a relatively larger lighting area, thereby achieving flood lighting. It should be noted that, the difference between the lighting angle of the directional lighting module 470 and the lighting angle of the flood lighting module 480 can be flexibly designed according to the usage requirements of the fan lamp, which is not limited in the embodiments of the present disclosure.

In an optional embodiment, the flood lighting module 480 includes a second light source plate 481, a light homogenizing lampshade 483 and at least one second light emitting module 482. The light homogenizing lampshade 483 is connected to the bottom disc 410, and the light homogenizing lampshade 483 and the bottom disc 410 form a second optical cavity, the second light source plate 481 is installed in the second optical cavity, and the second light emitting module 482 is disposed on the second light source plate 481. The second light emitting module 482 includes a second light emitting unit and a second light distribution element. The second light distribution element is disposed on and covers the exterior of the second light emitting unit. The second light emitting unit can emit light, and the light emitted by the second light emitting unit enters the second light distribution element, and is scattered by the second light distribution element, thereby improving the uniformity of the flood lighting module 480 while lighting. Further, after the light emitted by the second light emitting unit enters the second light distribution element and is redistributed, the light enters the light homogenizing lampshade 483, and the light homogenizing lampshade 483 can further improve the divergence of the light, thereby improving the uniformity of the flood lighting module 480 while lighting, so as to improve the lighting effect of the flood lighting module 480.

In an optional embodiment, the first light source plate 471 and the second light source plate 481 are both straight strip-shaped plates, and the extending direction of the first light source plate 471 is parallel to the extending direction of the second light source plate 481; alternatively, the first light source plate 471 and the second light source plate 481 are both arc-shaped plates, and the center of the circle where the first light source plate 471 is located coincides with the center of the circle where the second light source plate 481 is located. Through using these two structures, a more regular lighting area can be generated no matter whether the directional lighting module 470 and the flood lighting module 480 work separately, or the directional lighting module 470 and the flood lighting module 480 work simultaneously; meanwhile, the shape of the lighting area of the directional lighting module 470 is substantially the same as the shape of the lighting area of the flood lighting module 480, such that the brightness of the overall lighting area of the fan lamp changes regularly, which can bring better visual experience to the user. In addition, in the case where the first light source plate 471 and the second light source plate 481 are both straight strip-shaped plates or arc-shaped plates, the structure of the fan lamp is more compact, the processing technology is simpler, and the cost is lower.

In an optional embodiment, the number of the flood lighting module(s) 480 is at least two, and at least one directional lighting module 470 is disposed between adjacent flood lighting modules 480. In the case where at least one directional lighting module 470 is disposed between adjacent flood lighting modules 480, the lighting area of the directional lighting module 470 is surrounded by the lighting areas of the flood lighting modules 480, and the lighting area of the directional lighting module 470 is located in the middle of the lighting areas of the lighting modules 480, which makes the lighting areas of the fan lamp have symmetry, thereby improving the lighting effect of the fan lamp.

In some other embodiments, the light source assembly 400 further includes a surface frame 490, the surface frame 490 is connected to the bottom disc 410, and the surface frame 490 is disposed to have first accommodating holes 491 and second accommodating holes 492, and the flood lighting module 480 is at least partially located in the first accommodating hole 491, the directional lighting module 470 is at least partially located in the second accommodating hole 492. Through using such a structure, the surface frame 490 can appropriately separate and block the directional lighting module 470 and the flood lighting modules 480 from each other, so that the lighting areas of the flood lighting modules 480 and the lighting areas of the directional lighting modules 470 do not interfere with each other, which is advantage for the fan lamp to realize the division of the key lighting area and the atmosphere lighting area, thereby improving the lighting effect of the fan lamp. In addition, the flood lighting module 480 is at least partially located in the first accommodating hole 491, and the directional lighting module 470 is at least partially located in the second accommodating hole 492, which can prevent dust from entering the flood lighting module 480 and the directional lighting module 470, and is beneficial for the flood lighting module 480 and the directional lighting module 470 to work more stably.

Further, at least two second accommodating holes 492 are disposed between adjacent first accommodating holes 491, and at least two directional lighting modules 470 are one-to-one correspondingly installed at the at least two second accommodating holes 492. In this embodiment, the respective directional lighting modules 470 are installed at different second accommodating holes 492, so that the lighting areas of the respective directional lighting modules 470 are less likely to interfere with each other, which is beneficial for the directional lighting modules 470 to perform directional lighting on key areas. Meanwhile, in the case where the size of the directional lighting area is definite, through installing at least two directional lighting modules 470 using at least two second accommodating holes 492, the size of the single second accommodating hole 492 can be appropriately reduced, so as to ensure the structural strength of the surface frame 490.

In an optional embodiment, the fan lamp further includes a controller, which is electrically connected to the directional lighting module 470 and the flood lighting module 480, respectively, and the controller is used to control the working states of the directional lighting module 470 and the flood lighting module 480. In the case where the controller controls one of the directional lighting module 470 and the flood lighting module 480 to work, the fan lamp can independently achieve accent lighting or atmosphere lighting for the space; in the case where the controller controls the directional lighting module 470 and the flood lighting module 480 to work simultaneously, the fan lamp can realize accent lighting and atmosphere lighting for the space at the same time. Through controlling the working states of the directional lighting module 470 and the flood lighting module 480 by the controller, the lighting effect of the fan lamp is improved. Further, the fan lamp can be equipped with a remote controller, which can perform wireless data transmission with the controller, and the user can connect the controller through the remote controller to control the working states of the directional lighting module 470 and the flood lighting module 480.

The above-described controller may only be used to control the working states of the directional lighting module 470 and the flood lighting module 480, and may also be used to control the state of the blade assembly 300. Referring to the foregoing description, the controller can be integrated in a circuit board, thereby further improving the structural compactness of the fan lamp.

The technical solutions adopted in the present disclosure can achieve the following beneficial effects:

In the fan lamp disclosed in the embodiments of the present disclosure, the driving motor of the blade assembly and the light source assembly can be electrically connected to the same one driver, such that the blade assembly and the light source assembly can be driven by the same one driver, compared with the method in which the blade assembly and the light source assembly are driven by their respective drivers, the number of components and parts of the fan lamp disclosed in the embodiments of the present invention is reduced, therefore, the space occupied by the fan lamp is smaller, which is convenient for the transportation of the fan lamp.

The above embodiments of the present disclosure mainly describe the differences between the various embodiments. The various embodiments can be combined to form better embodiments, as long as the different optimization features of the various embodiments are not contradictory. For the sake of brevity, the details are not described here.

The above descriptions are merely embodiments of the present disclosure, and are not intended to limit the present disclosure. Various modifications and variations can be made to the present disclosure for those skilled in the art. Any modification, equivalent replacement, improvement, etc. made within the spirit and principle of the present disclosure should be included within the scope of the claims of the present disclosure.

The invention claimed is:

1. A fan lamp, comprising:

a ceiling assembly;

a blade assembly that comprises a base plate, a plurality of retractable blades and a driving motor, wherein the plurality of retractable blades are rotatably installed on the base plate, and the driving motor is connected to the base plate;

a hanger rod comprising one end that is connected to the ceiling assembly, and another end of the hanger rod is connected to a first end of the driving motor;

a light source assembly that comprises a bottom disc, a light source plate and a light transmitting lampshade, wherein the light source plate is installed on the bottom disc and the bottom disc is connected to a second end of the driving motor, and the light source assembly is located on a side of the blade assembly away from the ceiling assembly, wherein the light source assembly further comprises an installation disc that prevents the blade assembly from driving the light source assembly to rotate, limits shaking of the bottom disc, and separates the blade assembly and the light source assembly, wherein the installation disc is disposed between the blade assembly and the bottom disc, the second end of the driving motor penetrates through the installation disc, the installation disc and the bottom disc abut against each other, and the installation disc directly connects with the bottom disc; and a driver installed on the ceiling assembly, the blade assembly, or the light source assembly, wherein the driver is configured to be electrically connected to both the driving motor and the light source plate installed on the bottom disc.

2. The fan lamp according to claim 1, wherein the ceiling assembly comprises a ceiling box, the ceiling box comprises an installation cavity, and the driver is installed in the installation cavity.

3. The fan lamp according to claim 2, wherein the ceiling assembly further comprises a hanger installed in the installation cavity, and the ceiling box is fixedly connected to the hanger, the hanger is provided with a connection portion, the connection portion comprises a connection hole and a first spherical surface, and the hanger rod comprises a second spherical surface, one end of the hanger rod passes through the connection hole, and the first spherical surface is attached to the second spherical surface.

4. The fan lamp according to claim 3, wherein the driver is installed between a lateral surface of the hanger and an inner wall of the ceiling box.

5. The fan lamp according to claim 1, wherein the driving motor comprises a casing, a stator module and a rotor module, two ends of the stator module are respectively connected to the hanger rod and the light source assembly, the rotor module is connected to the casing, and the casing is connected to the base plate.

6. The fan lamp according to claim 5, wherein the stator module is provided with a first through hole, the hanger rod is provided with a second through hole, the driver is electrically connected to the driving motor through a first electrical connector, and the driver is electrically connected to the light source assembly through a second electrical connector, the first electrical connector passes through the second through hole and is electrically connected to the stator module and the rotor module, and the second electrical connector sequentially passes through the second through hole and the first through hole, and are electrically connected to the light source assembly.

7. The fan lamp according to claim 5, wherein the blade assembly further comprises a motor cover and a connection piece, the motor cover is disposed on and covers an exterior of the casing, and the connection piece is connected to the motor cover, one end of the connection piece is connected to the hanger rod by insertion, and one end of the stator module extends into the connection piece.

8. The fan lamp according to claim 7, wherein the motor cover is provided with a third through hole, and the connection piece comprises a positioning plate and a tubular body, the positioning plate is positioned and matched with the motor cover, one end of the tubular body is connected to the positioning plate, and another end of the tubular body passes through the third through hole and is connected to the hanger rod by insertion.

9. The fan lamp according to claim 8, wherein one end of the hanger rod is threadedly connected to the tubular body, and the tubular body is provided with a first insertion hole, the hanger rod is provided with a second insertion hole, and a latch is disposed at the first insertion hole and the second insertion hole.

10. The fan lamp according to claim 9, wherein the fan lamp further comprises a shielding cover, and the shielding cover is disposed on and covers an exterior of the latch; and wherein the shielding cover is provided with a fourth through hole, an elastic ring is disposed at the fourth through hole, and the elastic ring surrounds the hanger rod.

11. The fan lamp according to claim 1, wherein the fan lamp further comprises a positioning member, the bottom disc is connected to the light transmitting lampshade, and the bottom disc and the light transmitting lampshade form a first optical cavity, and the light source plate is installed in the first optical cavity, and wherein a second end of the driving motor extends into the first optical cavity, and the positioning member is installed on the second end of the driving motor and is located in the first optical cavity, the positioning member is positioned and matched with the bottom disc.

12. The fan lamp according to claim 11, wherein the driver is installed in the first optical cavity; and wherein the light source plate is a ring-shaped plate with an inner hole, and at least a portion of the driver is located in the inner hole.

13. The fan lamp according to claim 11, wherein a direction parallel to the hanger rod is a first direction, and in the case where the plurality of retractable blades are in a retracted state, orthographic projections of the plurality of retractable blades along the first direction is located within an orthographic projection of the bottom disc along the first direction.

14. The fan lamp according to claim 11, wherein the light source assembly further comprises a decoration ring, and the decoration ring is disposed on an outer peripheral surface of the light transmitting lampshade.

15. The fan lamp according to claim 1, wherein the blade assembly further comprises a synchronizer and a plurality of installation bases, the synchronizer is rotatably installed on the base plate, and a rotation center of the synchronizer coincides with a rotation center of the base plate, and the plurality of retractable blades are rotatably installed to the base plate through the plurality of installation bases, the synchronizer is provided with a plurality of sliding slots, the plurality of installation bases are provided with protruding parts, and the protruding parts of the plurality of installation bases are in one-to-one correspondence with the plurality of sliding slots, respectively;

the blade assembly further comprises a plurality of torsion springs, first ends of the plurality of torsion springs are connected to the base plate, and second ends of the plurality of torsion springs are connected to the corresponding plurality of retractable blades.

16. The fan lamp according to claim 1, wherein the driver comprises a circuit board having an input end, a first output end and a second output end, the first output end is electrically connected to the driving motor, and the second output end is electrically connected to the light source assembly.

17. The fan lamp according to claim 1, wherein the light source assembly further comprises a directional lighting module, wherein the directional lighting module is configured for performing directional lighting on a concentrated lighting area.

18. The fan lamp according to claim 17, wherein the directional lighting module comprises the light source plate and at least one first light emitting module, the light source plate is installed on the bottom disc and the first light emitting module is installed on the light source plate, wherein the first light emitting module comprises a first light emitting unit and a first light distribution element disposed on and covers the exterior of the first light emitting unit, wherein light emitted from the first light emitting unit enters the first light distribution element, and the first light distribution element changes a propagation direction of the light to adjust lighting angle of the directional lighting module.

19. The fan lamp according to claim 18, wherein the first light distribution element comprises at least one of a convex lens and a concave lens.

20. The fan lamp according to claim 18, wherein the directional lighting module further comprises an anti-glare lampshade, and the anti-glare lampshade is connected to the first light distribution element.

* * * * *